(12) United States Patent
Laukkanen et al.

(10) Patent No.: US 11,268,239 B2
(45) Date of Patent: Mar. 8, 2022

(54) METHOD FOR PRODUCING PARENCHYMAL CELL CELLULOSE

(71) Applicant: Betulium Oy, Espoo (FI)

(72) Inventors: Antti Laukkanen, Helsinki (FI); Marko Lauraeus, Nummela (FI); Jason McKee, Helsinki (FI); Timo Pääkkönen, Helsinki (FI); Tapio Saarinen, Espoo (FI)

(73) Assignee: Betulium Oy, Espoo (FI)

( * ) Notice: Subject to any disclaimer, the term of this patent is extended or adjusted under 35 U.S.C. 154(b) by 627 days.

(21) Appl. No.: 16/062,493

(22) PCT Filed: Dec. 14, 2016

(86) PCT No.: PCT/FI2016/050870
§ 371 (c)(1),
(2) Date: Jun. 14, 2018

(87) PCT Pub. No.: WO2017/103329
PCT Pub. Date: Jun. 22, 2017

(65) Prior Publication Data
US 2020/0308765 A1    Oct. 1, 2020

(30) Foreign Application Priority Data

Dec. 15, 2015    (FI) .................................... 20155951

(51) Int. Cl.
*D21C 9/00*        (2006.01)
*D21H 11/12*       (2006.01)
(Continued)

(52) U.S. Cl.
CPC ................ *D21C 9/007* (2013.01); *C08B 1/00* (2013.01); *C08L 1/02* (2013.01); *D21C 3/02* (2013.01); *D21C 7/06* (2013.01); *D21C 7/08* (2013.01); *D21C 9/02* (2013.01); *D21C 9/10* (2013.01); *D21D 1/20* (2013.01); *D21H 11/12* (2013.01); *D21H 11/18* (2013.01)

(58) Field of Classification Search
CPC ........ D21H 11/12; D21H 11/16; D21H 11/18; D21C 9/007
USPC ..................................................... 162/94–99
See application file for complete search history.

(56) References Cited

U.S. PATENT DOCUMENTS 4,831,127 A    5/1989  Weibel
5,964,983 A    10/1999 Dinand et al.
(Continued)

FOREIGN PATENT DOCUMENTS

EP    0102829 A1     3/1984
WO    2014017911 A1  1/2014
(Continued)

OTHER PUBLICATIONS

Smook, Handbook for Pulp and Paper Technologists, 1992, Angus Wilde Publications, 2nd edition, chapters 9 and 11 (Year: 1992).*
(Continued)

*Primary Examiner* — Anthony Calandra
(74) *Attorney, Agent, or Firm* — Ziegler IP Law Group LLC

(57) ABSTRACT

A method for producing parenchymal cell cellulose by using a high consistency alkali treatment and an optional refinement step, as well as an apparatus for its manufacture.

8 Claims, 2 Drawing Sheets

(51) Int. Cl.
  *D21H 11/18* (2006.01)
  *C08B 1/00* (2006.01)
  *C08L 1/02* (2006.01)
  *D21C 3/02* (2006.01)
  *D21C 7/06* (2006.01)
  *D21C 7/08* (2006.01)
  *D21C 9/02* (2006.01)
  *D21C 9/10* (2006.01)
  *D21D 1/20* (2006.01)

(56) References Cited

U.S. PATENT DOCUMENTS

| | | | | |
|---|---|---|---|---|
| 2013/0105097 A1* | 5/2013 | Joutsimo | ............... | D21C 3/00 |
| | | | | 162/60 |
| 2014/0018555 A1 | 1/2014 | De Vries et al. | | |
| 2015/0101773 A1* | 4/2015 | Moss | .................. | D21C 5/00 |
| | | | | 162/148 |
| 2016/0030907 A1* | 2/2016 | van Engelen | ........ | C09D 101/00 |
| | | | | 435/277 |

FOREIGN PATENT DOCUMENTS

| | | |
|---|---|---|
| WO | 2014017913 A1 | 1/2014 |
| WO | 2017019864 A1 | 2/2017 |

OTHER PUBLICATIONS

Citrus pellets, Transport Information service [downloaded online from www.tis-gdv.de], downloaded on Jan. 13, 2021 (Year: 2021).*
Finnish Patent and Registration Office, Search Report, Application No. 20155951, dated Jun. 30, 2016, 1 page.
International Search Report, Application No. PCT/FI2016/050870, dated Mar. 3, 2017, 6 pages.
Finnish Patent And Registration Office, Office Action, Application No. 20155951, dated Oct. 30, 2016, 4 pages.
Written Opinion of the International Searching Authority, Application No. PCT/FI2016/050870, dated Mar. 3, 2017, 5 pages.
Chan et al. "Pectin as a rheology modifier: Origin, structure, commercial production and rheology" Carbohydrate Polymers 2017, 161, 118-139 Available online Dec. 24, 2016, http://dx.doi.org/10.1016/j.carbpol.2016.12.033, 22 pages.

* cited by examiner

METHOD FOR PRODUCING PARENCHYMAL CELL CELLULOSE

BACKGROUND

In nature, native cellulose is in a microfibrillar form, being part of wall structures of the plant cell. In primary cell walls, especially in parenchyma cells, cellulose microfibrils are distributed randomly forming a flexible membrane layer together with other polysaccharides, such as pectin and hemicelluloses. In certain plant species, an additional secondary wall structure is formed after the cell is fully-grown, especially in various wood species. In the secondary cell walls, the microfibrils are highly aligned mostly in the same direction and tightly bound to each other through hydrogen-bonding and covalent lignin bridges, forming a very rigid structure.

Cellulose microfibrils located either in primary or secondary walls are structurally very similar, if not identical (Thomas et al., Structure of Cellulose Microfibrils in Primary Cell Walls). Both type of microfibrils consist of highly aligned cellulose macromolecule chains forming mechanically strong cellulose crystals with hydrogen bonded parallel polymer chains. The microfibrils are generally considered to contain only few faults along their axis, although the degree of crystallinity varies between plant species being generally higher for microfibrils obtained from secondary walls. It is commonly understood that, depending on the plant species, 18, 24, or 36 cellulose chains form the smallest aligned structure, which is known as cellulose elementary fibril having diameter of a few nanometers and lengths up to tens of micrometers. These nanofibers have remarkable mechanical properties: tensile strength in the order of 138 GPa and toughness in the order of 13 GPa. Thus, cellulosic microfibrils are of interest if they can be dissociated into single fibres.

Although the secondary cell walls, for example in wood, are rich of cellulose microfibrils, isolation of the structures without damaging the fibrils itself is very difficult. Also, the needed fibrillation process is complicated, expensive, and often a chemical pre-treatment is needed prior to fibrillation. Plant tissues made of primary cell walls, however, form an alternative source for the separation of the microfibrils. Cells with primary walls are common for example in all fruit and vegetable species. These plants are mainly composed of parenchyma cells, i.e. ground tissue that generally constitutes the "filler" tissue in soft parts of plants. They have thin but flexible primary cell walls and the secondary cell wall is usually absent. The parenchyma tissue has a variety of functions, for example, to store starch in tubers, such as potato and cassava or storage of sucrose in sugar beet and sugar cane pith. In addition to the loose deposition of the microfibrils in the primary walls, the other polysaccharides present in the cell wall have a more charged nature.

In certain plant species, primary and secondary cell wall structures co-exist. For example, in various grasses the plant structure is composed of rigid outer shell made of macroscopic cellulose fibers with a thick secondary cell wall and a soft internal core, a pith tissue, made of predominantly parenchyma cells with a thin primary wall. The core part often contains also a small fraction of cellulose fibers.

SUMMARY

According to a first aspect is provided a method for producing parenchymal cell cellulose comprising:
1. Treating parenchymal cellulose raw material with an alkali
2. Recovering a first solid extract
3. Optionally washing the recovered first solid extract with a solvent and recovering a second solid extract;
wherein the solids content of the first recovered solid extract and/or the recovered second solid extract comprising parenchymal cell cellulose is at least 8 wt-%, preferably 8-30 wt-% most preferably 8-15 wt-%.

The method makes it possible to process raw material having high solids content.

Further, the method improves energy efficiency of cellulose extraction and decreases water consumption and chemical consumption, alkali in particular.

According to a second aspect is provided a parenchymal cell cellulose product obtainable by the method according to the first aspect, wherein the glucose content of fully hydrolyzed product is at least 50%, preferably between 50 to 90%, most preferably 60 to 80%.

According to a third aspect is provided a nanofibrillar parenchymal cellulose product obtainable by a the method according to the first aspect having a Brookfield viscosity of at least 10 Pas, preferably at least 100 Pas, measured at concentration of 1.0 weight-% at 100 rpm shear rate and/or a turbidity value less than 1000 NTU, preferably in the range of 100-700 NTU, measured at 0.1 weight-% concentration.

According to a fourth aspect is provided an alkali soluble product obtainable in step 1 or 2 or 3 of the method according to the first aspect by separating a liquid extract from the solid extract and recovering the liquid extract.

According to another aspect is provided a parenchymal cell cellulose product obtainable by the method according the first aspect, wherein the glucose content of fully hydrolyzed product is at least 18%, preferably between 18 to 50%, most preferably 20 to 50%.

According to another aspect is provided a parenchymal cell cellulose product obtainable by the method according to the first aspect, wherein the glucose content of fully hydrolyzed product is at least 18%, preferably between 50 to 70%, most preferably 55 to 65%.

According to a fifth aspect is provided a counter current reactor comprising
  a. A first counter current extraction zone comprising a first end, a second end, and:
    i. At least one feeding inlet in the first end configured to feed raw material in the first counter current extraction zone
    ii. At least one first liquid extract outlet in the first end for discharging a first liquid extract, and optionally at least one liquid extract outlet at any position along the device
    iii. At least one first solvent feed inlet in the second end configured to feed solvent in the second counter current extraction zone, and optionally at least one liquid feed inlet at any position along the device
    iv. At least one extraction outlet in the second end configured to allow discharging a first solid extract
    v. An optional by-pass outlet for discharging at least partially the first solid extract to the refiner unit
  b. A second counter current extraction zone comprising a first end and a second end, and i. At least one second feeding inlet in the first end configured to feed the solid extract from the extraction outlet to the first end of the second counter current extraction zone
ii. At least one second liquid extraction outlet in the first end for discharging a second liquid extract
iii. At least one second solvent feed inlet in the second end configured to feed solvent in the second counter current extraction zone
iv. At least one solid extract outlet in the second end configured to allow discharging a second solid extract
c. A refiner unit comprising
i. a first solid extract inlet configured to receive the second solid extract
ii. An optional by-pass inlet configured to allow feeding the first solid extract
iii. Refining means allowing fibrillation of the solid extract to nanofibrillar parenchymal cellulose
iv. At least one outlet for discharging the refined product or transferring the refined material to sequential refining passages before final discharging.

According to another aspect is provided a counter current reactor comprising
a. A first counter current extraction zone comprising a first end, a second end, and
i. At least one feeding inlet in the first end configured to feed raw material in the first counter current extraction zone
ii. At least one first liquid extract outlet in the first end for discharging a first liquid extract, and optionally at least one liquid extract outlet at any position along the device
iii. At least one first solvent feed inlet in the second end configured to feed solvent in the second counter current extraction zone, and optionally at least one liquid feed inlet at any position along the device
iv. At least one extraction outlet in the second end configured to allow discharging a first solid extract
v. An optional by-pass outlet for discharging at least partially the first solid extract to the refiner unit, and
vi. A concentrating screw conveyor inside and passing through the first counter current extraction zone and configured to recover, concentrate and transfer the raw material from the first end to the second end;
b. A second counter current extraction zone comprising a first end and a second end, and
i. At least one second feeding inlet in the first end configured to feed the solid extract from the extraction outlet to the first end of the second counter current extraction zone
ii. At least one second liquid extraction outlet in the first end for discharging a second liquid extract
iii. At least one second solvent feed inlet in the second end configured to feed solvent in the second counter current extraction zone
iv. At least one solid extract outlet in the second end configured to allow discharging a second solid extract; and
v. A concentrating screw conveyor inside and passing through the second counter current extraction zone and configured to recover, concentrate and transfer the raw material from the first end to the second end;
c. A refiner unit comprising
i. a first solid extract inlet configured to receive the second solid extract
ii. An optional by-pass inlet configured to allow feeding the first solid extract
iii. Refining means allowing fibrillation of the solid extract to nanofibrillar parenchymal cellulose
iv. At least one outlet for discharging the refined product or transferring the refined material to sequential refining passaged before final discharging.

According to a sixth aspect is provided a reactor system comprising
a. A first extraction zone comprising a first end, a second end, and a mixer unit and a reactor between the first end and the second end, wherein:
i. The mixer unit is arranged in the first end of the extraction zone and the reactor is arranged in the second end of the extraction zone;
ii. The mixer unit comprises at least one feeding inlet configured to receive raw material into the mixer unit
iii. The mixer unit comprises at least one first solvent feed inlet configured to receive solvent into the mixer
iv. The mixer unit comprises at least one mixer unit outlet configured to allow transfer to the reactor
v. The mixer unit comprises means to mix the solvent feed with the raw material
vi. The reactor comprises at least one reactor feed inlet configured to receive material from the mixer unit; and
vii. The reactor comprises at least one reactor feed outlet, having an optional by-pass outlet connected to the refiner unit
b. An optional second extraction zone comprising a first end and a second end, and
i. At least one second feeding inlet in the first end configured to receive material from the reactor feed outlet
ii. At least one second liquid extraction outlet for discharging a second liquid extract
iii. At least one second solvent feed inlet configured to receive solvent in the second extraction zone
iv. At least one solid extract outlet in the second end configured to allow discharging a second solid extract;
c. An optional refiner unit comprising
i. a first solid extract inlet configured to receive the solid extract from the second extraction zone
ii. An optional by-pass inlet configured to allow receiving material from the reactor by-pass outlet
iii. Refining means configured to fibrillate cellulosic material into nanocellulose
iv. At least one outlet configured to discharge the refined product, or to transfer the refined material to sequential refining passages before final discharging; and
d. An extractor unit comprising
i. At least one feeding inlet configured to receive material from the reactor feed outlet of the reactor, or optionally from the at least one outlet of the optional refiner unit.
ii. Optionally at least one second feeding inlet configured to receive material from the solid extract outlet of the second extraction zone, or from the at least one outlet of the refiner unit
iii. Extracting means configured to separate water and water soluble components from the pulp
iv. At least one liquid extraction outlet configured to discharge a liquid extract v. At least one outlet configured to discharge a concentrated extract or optionally to transfer the concentrated extract to sequential refining passages in the refiner unit before final discharging.

According to another aspect is provided a reactor comprising
a. A first extraction zone comprising a first end, a second end, and a mixer unit and a reactor between the first end and the second end, wherein:
  i. The mixer unit is arranged in the first end of the counter current extraction zone and the reactor is arranged in the second end of the counter current extraction zone;
  ii. The mixer unit comprises at least one feeding inlet configured to receive raw material into the mixer unit
  iii. The mixer unit comprises at least one first solvent feed inlet configured to receive solvent into the mixer
  iv. The mixer unit comprises at least one mixer unit outlet configured to allow transfer to the reactor
  v. The reactor comprises at least one reactor feed inlet configured to receive material from the mixer unit
  vi. The reactor comprises at least one reactor feed outlet, having an optional by-pass outlet connected to the refiner unit, or optionally to the extractor unit;
b. A second extraction zone comprising a first end and a second end, and
  i. At least one second feeding inlet in the first end configured to receive material from the reactor feed outlet
  ii. At least one second liquid extraction outlet for discharging a second liquid extract
  iii. At least one second solvent feed inlet configured to receive solvent in the second extraction zone
  iv. At least one solid extract outlet in the second end configured to allow discharging a second solid extract
c. A refiner unit comprising
  i. a first solid extract inlet configured to receive the solid extract from the second extraction zone
  ii. An optional by-pass inlet configured to allow receiving material from the by-pass outlet
  iii. Refining means allowing fibrillation of the solid extract into nanocellulose
  iv. At least one outlet for discharging the refined product or transferring the refined material to sequential refining passages before final discharging.
d. An extractor unit comprising
  i. At least one feeding inlet in the first end configured to receive material from the reactor feed outlet
  ii. At least one liquid extraction outlet for discharging a liquid extract
  iii. At least one outlet for discharging the extracted solid extract or transferring the refined material to sequential refining passages before final discharging
  v. At least one outlet for discharging the extracted liquid extract or transferring the refined material to post-processing (e.g. fractionation).

From the reactor an optional route for the mixture can be used leading to an optional extractor to separate soluble components from the solid extract. The resulting solid extract can be refined either directly or after adjustment of pH, concentration, ionic strength or a combination thereof.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
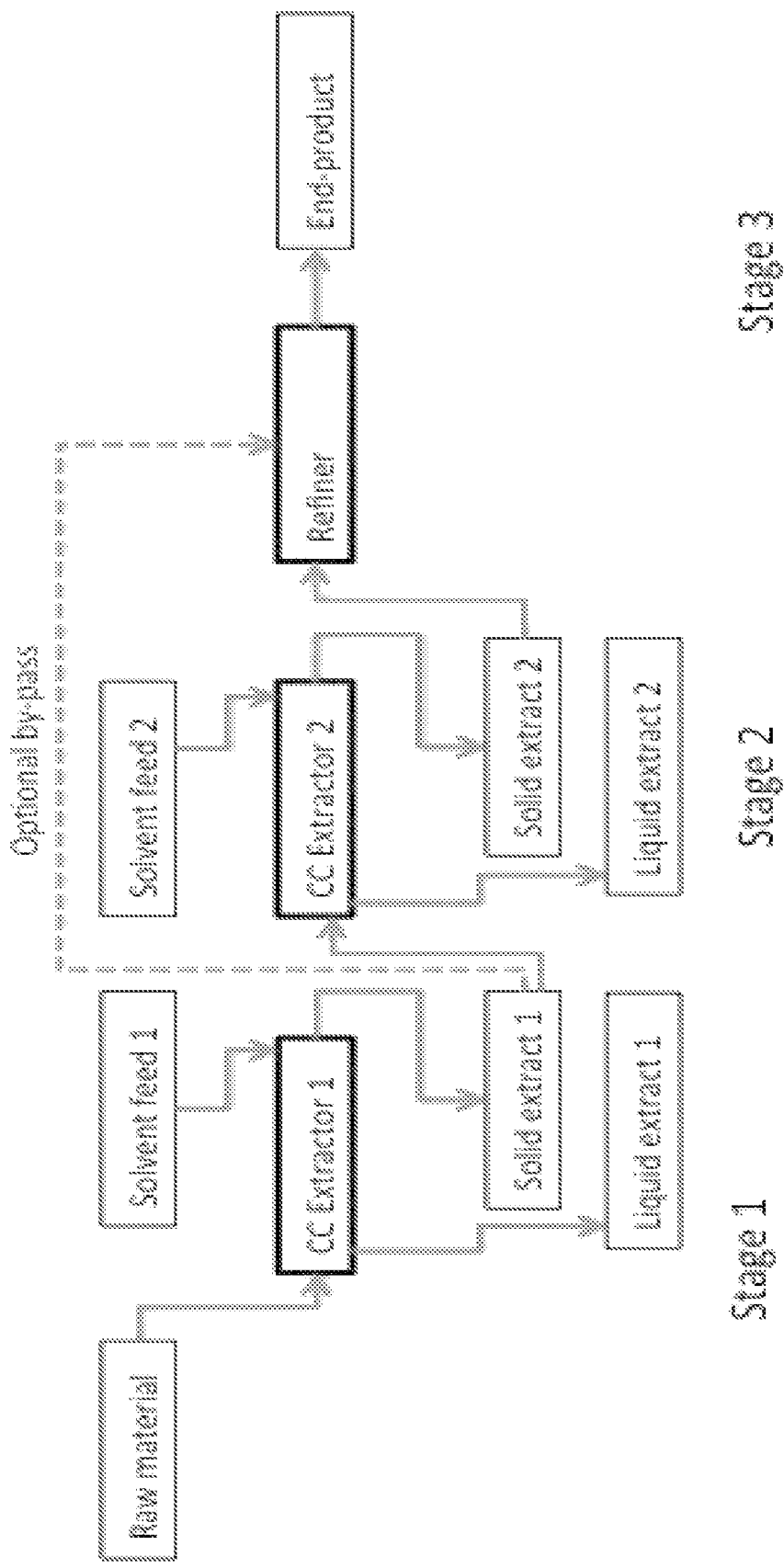
FIG. 1 illustrates an embodiment of the present process, in which raw material is processed in a counter extractor 1 (CC Extractor 1) and a counter current extractor 2 (CC Extractor 2), and the resulting solid extract is refined in a Refiner to obtain an end product.

In an embodiment of the first aspect, step 1 and/or step 2, and/or step 3 is/are conducted using a counter-current process.

In an embodiment of the first aspect, the step 1, and/or step 2, and/or step 3 is/are conducted using a percolation process.

In an embodiment of the first aspect the step 1 and/or step 2 and/or step 3 is/are conducted using a continuous process.

In an embodiment of the first aspect the steps 1-2 and optionally 3 are conducted using a batch process.

In an embodiment of the first aspect the method is carried out using a concentrating screw conveyor. Preferably the concentrating screw conveyor is used to concentrate the product in the recovery step. The concentrating screw conveyor may be arranged in line with and after the transfer screw of the counter current reactor. In another embodiment the concentrating screw conveyor comprises a perforated screw. In an embodiment the raw material and the product resulting from the alkali treatment or washing, is moved against the flow of the liquid phase by the action of the screw. In embodiment the liquid phase is the liquid extract, or the alkali soluble product, such as the liquid extract 1 or 2 of FIG. 1 or Liquid Extract 0 or 1 of FIG. 2.

In an embodiment of the first aspect the parenchymal cellulose raw material has, in average, at least one dimension having a length of at least 3 mm, preferably 3 to 100 mm, most preferably 3 to 30 mm, during the step 1, and optionally during the step 3. In said dimensions a continuous process such as a counter current process is easier to carry out, as the counter current of the solvent is optimal. In an embodiment the raw material is in the form of clippings or cuttings. Further, in said dimensions the alkali treatment may provide parenchymal cell cellulose in the form of ghost cells and alkali soluble extracts are at least partially removed with the solvent.

In an embodiment the raw material is never dried, preferably never dried sugar beet cutting.

In an embodiment the raw material comprises dried sugar beet, preferably dried sugar beet cutting. In another embodiment the raw material comprises pelleted sugar beet.

In another embodiment the parenchymal cellulose raw material has at least one dimension below 5 mm. This size is preferable in a continuous alkali treatment process or when counter current process is not used. Optional washing can be carried out e.g. a continuous extractor or a centrisieve.

In an embodiment of the first aspect the method comprises a chemical modification step selected from oxidation, cationization, acetylation, electrophilic substitution, esterification, and etherification, the chemical modification step being carried out before, during or after step 1 or 3.

In another embodiment, the nanofibrillar parenchymal cellulose is obtained by mechanical treatment, such as homogenization or refining or grinding, without preceding treatment steps of the parenchymal cellulose raw material, which are selected from enzymatic modification, chemical modification, or physical modification of the raw material. In chemical modification, the chemical structure of the cellulose structure is changed and in physical modification, anionic, cationic, or non-ionic substances are adsorbed on cellulose surface.

In an embodiment of the first aspect the method further comprises a concentrating step to increase concentration to above 8 wt-%, preferably between 8-50 wt-%, most preferably 10-25 wt-%. The concentrating step may be carried out before after or during step 1, 2 and/or 3. The concentrating may be carried out to maintain the concentration at a preselected level or range during selected steps or stages of the process.

In an embodiment of the first aspect the method further comprises a refining step to obtain nanofibrillar parenchymal cellulose.

In another embodiment the refinement is carried out at least to the first solid extract. This may be advantageous when the desired properties of the parenchymal cell cellulose do not require a further chemical treatment or washing.

In another embodiment the refinement is carried out at least to the second solid extract. This may be advantageous when a further chemical treatment stage or a washing stage is desired after the alkali treatment.

In another embodiment the refinement is carried out to the first and to the second solid extract.

In an embodiment of the first aspect the refining step is carried out to obtain nanofibrillar parenchymal cellulose having solids content corresponding or being higher than the solids content after the step 1 or step 3. In an embodiment the solid extract is not concentrated before refinement.

In an embodiment of the first aspect the obtained nanofibrillar parenchymal cellulose is concentrated to a concentration above 8%, preferably 10-100%, most preferably 20-95%. The concentrating can be carried out using a concentrating screw conveyor.

In an embodiment of the first aspect the obtained parenchymal cell cellulose is concentrated to a concentration above 8%, preferably 10-100%, most preferably 20-95% before refining. In an embodiment the parenchymal cell cellulose is the Solid Extract 2 shown in Process A.

In an embodiment of the first aspect the nanofibrillar parenchymal cellulose is further processed into a form of a granulate, dry or wet powder, pellet, tablet, briket, or any other discrete physical entity having at least one dimension less than 10 cm, or any combination of these, by compressing, extruding, cutting, blowing or milling.

In another embodiment the counter current process comprises using a screw, which pushes the product up in an incline towards the extraction outlet. In an embodiment the screw is adapted to allow effective counter current of the liquid through the extractor, while providing effective transfer of solids towards the extraction outlet, such as by using a screw with holes or an open helix.

In an embodiment the solvent feed is provided into the extractor via at least one solvent feed inlet. Preferably the solvent feed inlet is located near the second end of the counter current extraction zone. In another embodiment the solvent feed inlet or inlets are located at the first end, the second end or between the first end and the second end. The solvent inlets may be used to add any agent inside the first counter current extraction zone, such as an alkali solution, neutral water, acidic solution, or solution that contains specific chemicals for surface modification or oxidation.

In an embodiment the method comprises recovering the first liquid extract. In an embodiment the first liquid extract is recovered from or near the first end through at least one first liquid extract outlet. In another embodiment the first liquid extract is recovered from the first end, the second end or between the first end and the second end.

In an embodiment of the fourth aspect the alkali soluble product is recovered from an outlet located in the distal part of the counter current extractor near the first end.

In an embodiment of the fifth aspect the refining unit is directly connected to the second extraction zone and optionally to the first extraction zone.

In an embodiment the first liquid extract outlet has one or more openings in the first counter current extraction zone.

In an embodiment the extraction outlet and/or the optional bypass outlet has one or more openings in the first counter current extraction zone.

In an embodiment the second liquid extract outlet has one or more openings in the second counter current extraction zone.

In an embodiment a first liquid extract separated from the first solid extract, or a second liquid extract separated from the second solid extract in the optional washing step 3, is at least partially repurposed as repurposed solvent into the treatment step 1 or the optional washing step 3. In an embodiment the repurposed solvent comprises liquid extract 1, 2, or a combination thereof (Process A in FIG. 1). In an embodiment the repurposed solvent is fed into the process through the first solvent feed inlet or the second solvent feed inlet.

In an embodiment, the method of the first aspect is continuous. In an embodiment the method is Process A described in FIG. 1.

In another embodiment the method of the first aspect is semi-continuous. In an embodiment the method is Process A described in FIG. 1.

Figure 2:
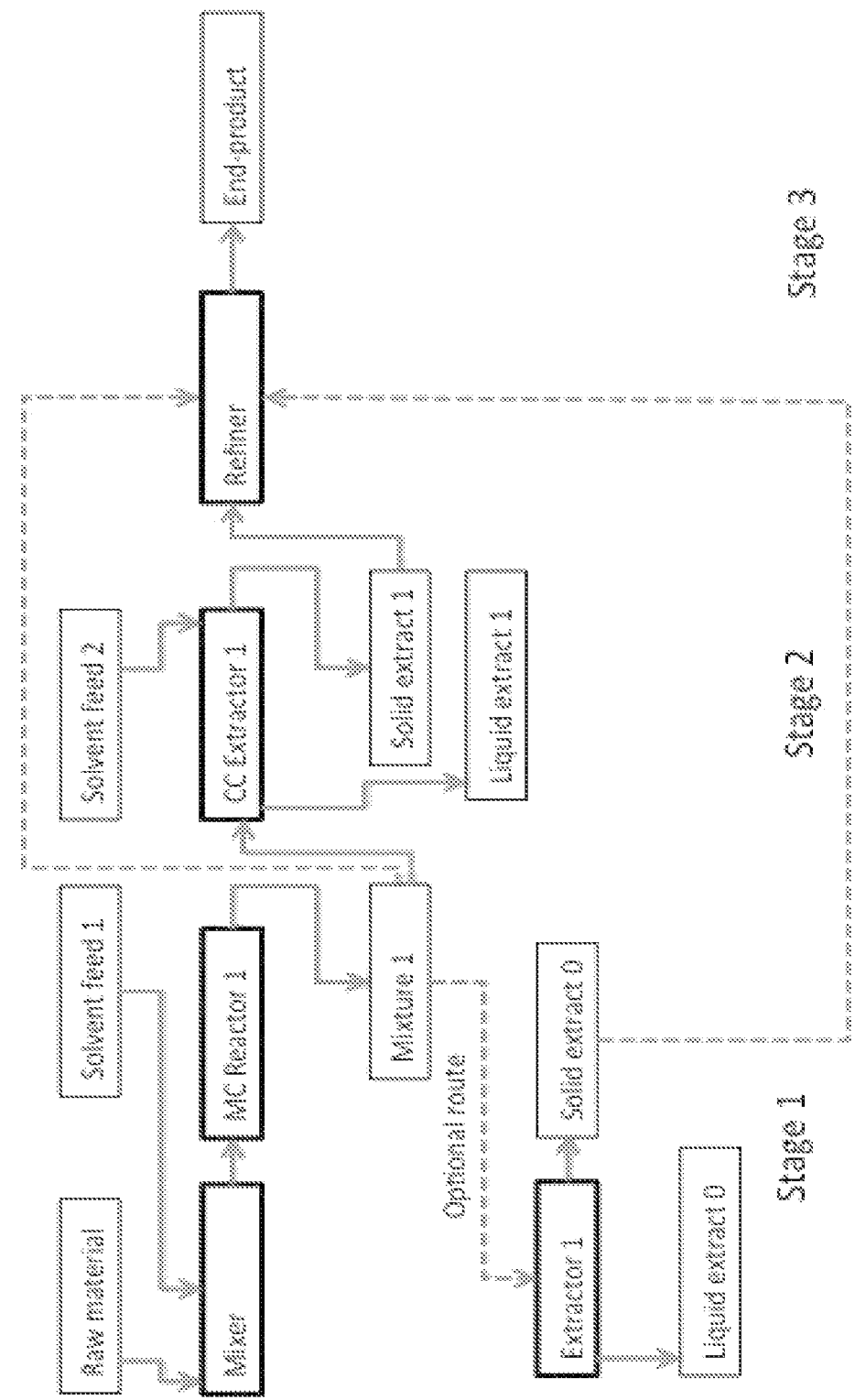
FIG. 2 illustrates an embodiment of the present process, in which raw material is mixed firstly in a Mixer with a solvent, and then in a medium consistency reactor (MC Reactor 1) to obtain a mixture which is processed in a counter current extractor 1 (CC Extractor 1) and a counter current extractor 2 (CC Extractor 2), and the resulting solid extract is refined in Refiner to obtain an end product and from the MC Reactor 1 the resulting mixture can optionally be taken to an Extractor for separating Liquid extract 0 and transferring the Solid extract 0 to the Refiner, thereby by-passing the CC Extractor 1.

In an embodiment the method of the first aspect is a continuous process, semi-continuous process or a batch process of the Process B described in FIG. 2.

In an embodiment the refiner unit has one or more openings for the by-pass stream and/or for the solid extract inlet.

In an embodiment the outlet of the refiner unit is in connection to at least one post processing unit selected from compressor, extruder, cutter, blower, mill, extractor, and fractionator.

In an embodiment the counter current reactor has an elongated and/or cylindrical shape.

In an embodiment the continuous process is an alkali extraction process done at a specific temperature preferably selected from the range between 0-99° C., such as 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99° C.

In another embodiment the method involves treating parenchymal cellulose raw material with an alkali in basic conditions containing at least 0.01 mol/l alkali, preferably 0.01-2 mol/l, most preferably 0.05-0.5 mol/l. The alkali treatment can be conducted in any of the following conditions: 0.01, 0.02, 0.03, 0.04, 0.05, 0.06, 0.07, 0.08, 0.09, 0.10, 0.11, 0.12, 0.13, 0.14, 0.15, 0.20, 0.25, 0.30, 0.35, 0.40, 0.45, 0.50, 0.55, 0.60, 0.65, 0.70, 0.75, 0.80, 0.85, 0.90, 0.95, 1, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, or 2 mol/l.

In an embodiment the continuous alkali extraction process is done at 30-50° C. to attain a liquid extract that contains pectin hydrolysis products that comprise linear homopolysaccharides consisting of $\alpha$-(1-4)-linked D-galacturonic acid repeating units. Suitable temperatures are 30, 31, 32, 33, 34, 35, 40, 45, 46, 47, 48, 49 and 50° C.

In an embodiment the continuous alkali extraction process is done at 50-60° C. to attain a liquid extract that contains pectin hydrolysis products that comprise linear homopolysaccharides consisting of $\alpha$-(1-4)-linked D-galacturonic acid repeating units. Suitable temperatures are 50, 51, 52, 53, 54, 55, 56, 57, 58, 59 and 60° C.

In an embodiment the continuous alkali extraction process is done at 60-90° C. to attain a liquid extract that contains pectin hydrolysis products that comprises galacturonic acid sugars, and other poly-, oligo-, and monosaccharides that are not pectin based structures. Suitable temperatures are 60, 61, 62, 63, 64, 65, 70, 75, 80, 85, 86, 87, 88, 89 and 90° C.

In an example embodiment, the Solid extract is characterized according to its glucose content as determined using the High-performance liquid chromatography method described in Example G. The initial glucose content can be 18 mol. % for sugar beet clippings raw material. After the first extraction stage (Stage 1, Process A) the relative glucose content increases to 18-50 mol. %, preferably 20-50 mol. %. After the second stage (Stage 2, Process A), the relative glucose content increases to 20-70 mol %, preferably 25-70 mol %.

In a batch process, such as Process B, the glucose content is increased to 18-50 mol. %, preferably 20-50 mol %.

'Solid extract', in the context of this application (see Process A and Process B, and the first solid extract and the second solid extract), is the wet parenchymal cellulose pulp during the extraction or during the recovering process from which organic and/or inorganic components have been extracted and discharged into a separate liquid phase (i.e. Liquid extract) using the processes. Also, the Solid extract can form a dynamic equilibrium with the Liquid extract. This means that there is interchange between these phases. For example, once Liquid extract has been discharged from the Solid Extract, it can flow down the counter current extraction device and be impregnated back into the Solid extract during the process. The Solid extract predominantly comprises parenchymal cellulose as well as pectin and hemicellulose in their native form, water, salts, minerals, alkali, and hydrolysis products that have not been extracted into the Liquid extract phase or have been impregnated into the pulp during or after the counter current step.

'Liquid extract', in the context of this application (see Process A and Process B), is a liquid phase that contains components and chemicals that have been extracted and discharged from the Solid extract during the extraction process or the recovering process. Also, the Liquid extract can form a dynamic equilibrium with the Solid extract. This means that there is interchange between these phases. For example, once Liquid extract has been discharged from the Solid extract, it flows down the counter current extraction device and can be impregnated back into the Solid extract during the process. The Liquid extract's solid content predominantly comprises partially or fully hydrolysed pectin and hemicellulose; salt; minerals; alkali and water. These components can be soluble or non-soluble.

'Recovering a solid extract' is a process step wherein a solid extract is discharged and post processed into a suitable form for a next processing step. Recovering can e.g. include transferring the discharged Solid extract, concentration and/or adding a biocide. A solid extract that has been recovered is called a 'Recovered solid extract'.

In an embodiment the first solid extract is the Solid extract 1 and the second solid extract is the Solid extract 2 (see Process A, FIG. 1).

In an embodiment the recovered first solid extract is the recovered Solid extract 1 and the recovered second solid extract is the recovered Solid extract 2 (see Process A, FIG. 1).

In an embodiment the first solid extract is either the Mixture 1 or the Solid extract 0 and the second solid extract is the Solid extract 1 (see Process B, FIG. 2).

In an embodiment the recovered first solid extract is either the recovered Mixture 1 or the recovered Solid extract 0 and the recovered second solid extract is the recovered Solid extract 1 (see Process B, FIG. 2).

In a preferred embodiment the recovered second solid extract is washed using water.

'Solids content' and 'dry matter content', in the context of this inventions, refers to the material remaining after the removal of volatile components at 105° C.

In an embodiment the sixth aspect the extractor unit comprises a mechanical press or a double screw press. In an embodiment the extractor unit is the 'Extractor 1' of Process B I FIG. 2. The extractor unit is most preferably configured to operate continuously.

In an embodiment of the sixth aspect the extractor unit comprises means for separating water and water soluble components from the pulp. In an embodiment the concentrated extract is the Solid extract 0 of FIG. 2.

In an embodiment of the sixth aspect the liquid extract recovered from the extractor unit is transferred to post-processing, such as fractionation.

In an embodiment of the sixth aspect the mixer unit and the reactor are combined into a combined batch processing unit wherein the reactor feed inlet of the reactor corresponds to the feeding inlet of the mixer unit and the reactor feed outlet corresponds to the mixer unit outlet. In this embodiment the reaction is not carried out in a separate reactor unit, but directly in the mixer unit which is adapted to operate as a reactor, i.e. it is a mixer/reactor unit.

In an embodiment the alkali soluble product, the liquid extract or the recovered liquid extract is post-processed. In an embodiment post-processing comprises fractionating.

The methodology to produce parenchymal cell cellulose can be achieved through various paths. Pectin and hemicelluloses can be separated from the native parenchymal cells by selective hydrolysis and/or extraction in alkali environment. Should one use mild enough methods for this process, one can achieve the hydrolysis and/or extraction in such a fashion that the primary cell wall matrix remains intact, while most of the soluble components are extracted out of the parenchymal cell. Mild hydrolysis is preferably carried out to leave the cell matrix intact, i.e. in some cases, the raw material morphology does not drastically change and a loosely attached parenchymal cells stay together, which enables utilization of continuous processes such as counter current or percolation processes in the extraction.

Once processed, the resulting parenchymal cell cellulose can be refined into a nanofibrillated product.

For the purpose of this present disclosure, the alkali extracted or alkali treated parenchymal cell cellulose may be called 'parenchymal cell cellulose'. Parenchymal cell cellulose in this context means plant based parenchymal cells, which are mostly liberated from the other cellular components except the cellulose microfibrils located in the primary walls of the cell. Majority of the other polysaccharides, such as pectin and hemicelluloses are de-attached from the primary wall as well as inorganic components and protein residuals. Shape of parenchymal cell cellulose is dependent on the plant source, but typically the cells are forming barrel-like or sack-like three-dimensional structures of 30-100 micrometers in diameter, i.e. not fiber-like structures as common cellulose pulp fibers. Typically the cell wall is only 0.1 micrometer thick and individual microfibrils are loosely deposited in random fashion along the cell wall. These structures are sometimes called as ghost-cells. In this invention, parenchymal cell cellulose means also loose associations of individual parenchymal cells, which is obtained after washing or de-attaching the other polysaccharides such as pectin or hemicelluloses from the primary cell wall. The size of these loose associations is partially dependent on the dimensions of the used parenchymal cellulose raw material, such as the size of sugar beet cutting or bagasse pith domain. Depending on the isolation process, the individual parenchymal cells and cell associations may be partially ruptured and for example the cell wall may be partially damaged. Typically the parenchymal cell cellulose contain at least 50% cellulose of the dry mass, often 60-80% or even 80-95%, depending on the level of purification.

The term "counter-current process" in this context means any solid-liquid process including washing, extraction, bleaching, chemical modification, adsorption, or compounding process wherein a counter-current principle is used. Typically a solid material is moved in a one direction and becomes in contact with a liquid component moving in an opposite direction. The treated solid is collected from the other end as well as the liquid from the other. The liquid may also be collected in another location between the ends. As a result, one or several components of the solid may be transferred to liquid (solvent) phase. Depending on the location where the liquid extract, or liquid phase, is recovered, different fractions may be obtained. The different fractions may have different chemical composition and they may be used in different post processing steps and in different applications depending on their composition. The chemical composition can also be controlled by the selection of the raw material. For example, the pH of the liquid extract may vary in different locations and pH-based fractionation may be obtained during the process. High concentrations of the extracted compounds and a low residual content of solute in the residue can be achieved via countercurrent-counter-current process design, which allows e.g. a considerable reduction of the solvent usage. Therefore, extraction times are shorter than those of batch methods and this has a beneficial effect on the quality of the end products.

The counter current process can be used also for bleaching or chemical modification of the solid phase, for example oxidation, cationization, esterfication or etherification. In these processes, the solvent includes one or several reagents, which may react with the solid phase during the counter current process. In this invention the solid phase is parenchymal cellulose raw material, acid and/or alkali treated parenchymal cellulose, and/or parenchymal cell cellulose. The liquid phase comprising solvent can be extraction liquid, such as acidic, neutral, or basic aqueous liquid. The liquid phase can also be a non-aqueous solvent, a water miscible solvent such as alcohol or a water non-miscible solvent, or a mixture of water and any of these. The liquid phase may contain bleaching chemicals, such as peroxides, hypochlorite, chlorite, chlorine gas, chlorine dioxide, ozone, hydrogen peroxides. The liquid may contain any suitable reagents, such as cationizing reagents, oxidizing reagents, TEMPO catalyst, acetylation reagents. The liquid phase may contain enzymes, especially cellulases which can react with the solid phase during the counter current process. The chemicals that are used in the chemical treatment may be added in the process using solvent feed inlets, or via other inlets. They may also be mixed with the parenchymal cellulose raw material.

There are various set-ups based on that can be adapted to the principle described above, such as BMA with the tower extractor, Crown Iron Works with the Model III™, Model IV™, and ModelV™ extractor, GEA Niro and Vatron Mau with a screw extractor, De Smet with the REFLEX™ and LMT™ extractor, Harburg-Freudenberger with the Carousel™ extractor, and Lurgi with the Sliding Cell™ extractor. Especially well suitable counter-current processing devices are so called continuous screw extractors.

The term "Percolation process" in this context means a process in which the solvent flows through a fixed bed of the solid matrix typically in down-flow mode. Depending on the physical properties of the solvent it may fill the void spaces between the particles or not. There is a constantly high concentration gradient, which results in an almost complete leaching of extractable components. Apart from the advantage of the percolation semi countercurrent processing, the main advantage of percolation is that it does not require a filtration step. The solid and liquid phase can be similar as was described for the "counter-current process" above as well as the described uses.

The "parenchymal cellulose raw material," which is used to produce the parenchymal cell cellulose and nanofibrillar parenchymal cellulose according to the present invention, may be obtained from any suitable plant source, including plant species that predominantly containing parenchyma cell types and/or wherein the majority of the cellulose is located in primary cell walls. Suitable raw materials include sugar beet pulp, potato pulp, cassava pulp, citrus peel, bagasse pith, sweet potato, corn, fruits, vegetables and mixtures thereof. Especially well suitable raw materials are sugar beet pulp, bagasse pith fraction, potato pulp, cassava pulp and mixtures thereof. Raw materials of which soluble polysaccharides, such as pectin, have been at least partially removed by a raw material producer are especially well suitable raw materials. Examples of these kinds of materials are parenchymal cellulose rich side streams from pectin factories using e.g. citrus peel, apple residuals, or sugar beet as a pectin source. Correspondingly, parenchymal cellulose rich side streams from potato or cassava based starch factories are especially well suitable raw materials.

Preferably the parenchymal cell cellulose is obtained from raw material comprising purified, optionally bleached, primary wall cells. Even more preferably the parenchymal cell cellulose is substantially free from cellulose fibers comprising secondary cell wall structures.

Preferably the parenchymal cell cellulose is obtained from parenchymal cellulose raw material having one dimension at least 3 mm during and/or after the alkali treatment. Preferably the parenchymal cellulose raw material is pre-processed or sliced and/or grated to a form having crosssectional dimension 1-5 mm and length at least 10 mm, preferably between 10 to 50 mm.

In an embodiment the parenchymal cellulose raw material, which is used to produce the isolated cellulose microfibrils according to the present invention is fresh, never dried, or dried.

In an embodiment, the parenchymal cellulose raw material is essentially dry, but not pelletized, beet pulp, commonly known as shredded beet pulp.

In an embodiment, the parenchymal cellulose raw material has, in average, at least one dimension having a length of at least 3 mm, preferably 3 to 100 mm, most preferably 3 to 30 mm, during the step 1, and optionally during the step 3.

Nanofibrillar parenchymal cellulose in this context means cellulose microfibrils or cellulose microfibril bundles isolated from the above-mentioned raw materials. The aspect ratio of the microfibrils is typically very high; the length of the microfibrils may be more than one micrometer and the number-average diameter is typically less than 200 nm, such as between 2 and 100 nm. The diameter of microfibril bundles may be greater, but it is usually less than 1 μm. The smallest microfibrils are similar to the so-called elementary fibrils, the diameter of which is typically 2 to 12 nm. Fibrillated parenchymal cellulose may also contain other polysaccharides, such as pectin, the amount of which, for example, depends on the raw material used and the processing method. Fibrillated parenchymal cellulose can be isolated from the above-described cellulose-containing raw material with an apparatus suitable for the purpose, e.g. a grinder, comminutor, rotor-stator mixer or grinders such as Ultra-Turrax, Masuko from Masuko Sangyo, rotor-rotor mixers or grinders such as Atrex-type devices, homogenizer such as Ariete-type or Panda-type from GEA Niro-Soavi, fluidizer, micro- or macrofluidizer such as microfluidizer from Microfluidics and/or ultrasonic disintegrator.

There are several widely used synonyms for these isolated microfibrils, for example; nanocellulose, microfibrillar cellulose, nanofibrillated cellulose, cellulose nanofiber, nano-scale fibrillated cellulose, microfibrillated cellulose (MFC), homogenized parenchymal cell cellulose, cellulose microfibrils, or fibrillated parenchymal cellulose.

Nanofibrillar parenchymal cellulose forms a continuous gel when dispersed in water, even at low concentration. A continuous gel in this context means a mixture of nanofibrillar parenchymal cellulose and water, where the nanofibrillar parenchymal cellulose component does not settle out of the continuous phase at rest.

After fibrillation the parenchymal cellulose of the present invention has improved rheological properties and the resulting gel comprising the fibrillated cellulose in an aqueous medium has increased viscosity.

Degree of fibrillation can be also followed by measuring turbidity of dilute aqueous dispersions of fibrillated parenchymal cellulose. Upon fibrillation, the particle size gradually decreases and light scattering from the dispersed particles is decreased. Fully nano-sized cellulose fibrils are substantially transparent in an aqueous medium.

Typically in the method, the aim is to obtain, as the final product, nanofibrillar parenchymal cellulose whose Brookfield viscosity, measured at a consistency of 1.0%, is at least 10 Pa·s, advantageously at least 100 Pa s. In addition to the high viscosity, the aqueous nanofibril cellulose dispersions obtained are also characterized by so-called shear thinning; that is, the viscosity decreases as the shear rate increases.

Furthermore, the aim is to obtain nanofibrillar parenchymal cellulose whose turbidity is typically lower than 1000 NTU, advantageously from 100 to 700 NTU, at a consistency of 0.1 wt-% (aqueous medium), measured by nephelometry Example A: Batch Production of Parenchymal Cell Cellulose and Nanofibrillar Parenchymal Cellulose from Potato and Sugar Beet (A Comparative Example)

One method to process raw materials consisting fully or predominantly of parenchymal cells can be done using a base extraction in a batch process. For example, these batch base extractions can be done at low solids content, with 0.05-6 wt. % of raw material and an initial amount of sodium hydroxide (NaOH), ranging from 0.01 M to 0.76 M. Such batch base extractions process can be done at high temperatures, such as 80° C. for 120 minutes. Once processed, the resulting slurry can be alternatively filtrated through a stainless steel mesh (eye hole: 0.25 mm). Using such batch processes, the degree of extraction can be varied though the base concentration. After filtration, the final yield is predominantly determined according to the raw material, temperature and base concentration. For example, at higher base loading (0.3-0.76 M) potato and sugar beet typically have yields ranging from 25 to 50%, after extraction.

The filtration, for batch extractions, can be done, for example, using vacuum filtration Here, the resulting parenchymal cell cellulose has a solids content between 2-7%, after filtration with copious amounts of water.

Batch Production of Nanofibrillar Parenchymal Cellulose Based on Potato Pulp

Concentrated potato pulp from a starch factory was purified in a lye wash. Here, the potato pulp was taken to a 25 g/L suspension and heated to 60-90° C. With gentle stirring, NaOH was added, e.g. 0.05 M. During this time, the hydrated potato clippings lost their solid-like morphology and broke down into a dark brown viscous mass within a minute. After 120 minutes of stirring, the reaction was cooled down and filtrated through a steel screen (0.25 mm pore size). The lye-washed pale grey cellulosic potato mass was further washed with copious amounts of water. The obtained material was suspended into water. The form and dryness of the raw material, extraction method, and fibrillation method varied. For example, potato pulp extracted according to this example was fibrillated mechanically using a rotor-rotor mixer (4 pass: Sample 174.4, 1800 rpm) or a homogenizer (4 pass: Sample 174.4H, 600 bar).

The resulting fibrillated parenchymal cellulose was characterized using turbidity and viscosity measurements, characteristic values are summarized in table 2.

Batch Production of Nanofibrillar Parenchymal Cellulose Based on Sugar Beet Pulp Compressed sugar beet pulp (26 wt % dry content) from a sugar factory was first washed in lye. Here, pulp was taken to a 25 dry g/L suspension and heated to 70-80° C. With gentle stirring, NaOH was added, e.g 0.05 M. During this time, the hydrated beet clippings lost their solid-like morphology and broke down into a dark brown viscous mass. After 120 minutes of stirring, the reaction was cooled down and filtrated through a steel screen (0.25 mm pore size). The lye-washed pale grey cellulosic sugar beet mass was further washed with copious amounts of water. The obtained material was suspended into water and fibrillated using a high-speed grinder at pH 8-10. The form and dryness of the raw material, extraction method, and fibrillation method varied. For example, pelleted sugar beet pulp extracted according to this example was fibrillated mechanically using a rotor-rotor mixer (4 pass: Sample 172.4, 1800 rpm).

The resulting nanofibrillar parenchymal cellulose was characterized using turbidity and viscosity measurements, characteristic values are summarized in Table 3.

Example B: Continuous Process Using a Continuous Screw Counter Current Extractor Parenchymal cellulose raw materials can be processed to parenchymal cell cellulose using a continuous extraction process. Here, a counter current reactor can be used with great effect. In more detail, a temperature stabilized counter current extraction device (CC Extractor) that contains a screw, or a twin screw, that pushes the product up a specific incline, from bottom (first end) to top (second end), as plug flow is most preferably used. Typically, this screw contains holes or is an open helix that allows liquid flow through it to allow for an effective counter current flow. Here, the speed, length and volume of the counter current reactor all affect the process. Simultaneously a solution is added as a continuous flow (e.g. Solvent feed 1, FIG. 1: PROCESS A) that most preferably flows gravimetrically through the parenchymal cell pulp down the slight incline from top to bottom. The aforementioned Solvent feed has a specific temperature and pumping speed. Most preferably, the Solvent feed is located at the top of the CC Extractor. However, the solvent feed can also be located anywhere along the CC Extractor (e.g. Solvent feed 1, FIG. 1: PROCESS A). Alternatively, two or more solvent feeds can be used along the CC Extractor (e.g. FIG. 1, PROCESS A). This stage can be repeated one or more times using different types of liquid feed sequences.

Here, each Solvent feed adds specific alkali solution, neutral water, acidic solution or solution that contains specific chemicals for surface modification or bleaching of the parenchymal cell cellulose into the CC extractor allowing for different types of processes. At the top of the CC Extractor, the solid extract is typically collected (e.g. Solid extract 1, FIG. 1, PROCESS A) and the liquid extract can be collected at the bottom part of the device. Alternatively, the liquid extract can be collected anywhere along the CC Extractor (Stage 1, FIG. 1, PROCESS A). Alternatively, two or more liquid extracts can be used anywhere along the counter current extractor (Stage 1, FIG. 1, PROCESS A). The resulting processed parenchymal cell cellulose (i.e. Solid extract) can be washed, most preferably using a continuous method (e.g. Stage 2, FIG. 1 This stage can be repeated one or more times using different types of liquid feed sequences.

To successfully utilize the aforementioned counter current process for parenchymal cellulose raw materials, specific considerations are required from the parenchymal raw material that determine the process type. For 'continuous base extraction', the raw material is preferably in such a form that it allows solvent feed flow through the parenchymal cell pulp through out the counter current process. In this context, cuttings or clippings, with one dimension at least 3 mm long are most preferred for the continuous counter current procedure. Additionally, the parenchymal raw material should preferably stay intact throughout the process: extraction, washing and possibly further chemical modification or bleaching. During the continuous base extraction process, parenchymal cell cellulose or "ghost cells" are formed and the soluble extracts (e.g. binding polymers and their hydrolysis products) are partially washed away via the solvent feed.

For 'continuous alkali treatment', the parenchymal raw material does not allow free flow of the solvent feed through the parenchymal cell pulp during the continuous counter current procedure. Rather, the raw material forms a gel plug, which does not allow solvent feed flow through the parenchymal cellulose raw material. In this context, the raw material is typically in the form of a fine powder or as pellets consisting of smaller constituents with dimensions typically below 3 mm. This process nevertheless allows for fabrication of parenchymal cell cellulose, where the soluble constituents (e.g. binding polymers and their hydrolysis products) are extracted to the surrounding pulp; however, not washed away as with the continuous extraction method. This means that, for example, the hydrolysis of the binding polymers can continue throughout the continuous base treatment process. The continuous base treated parenchymal cell pulp can then be washed using a continuous extractor (e.g. Stage 2, FIG. 2, PROCESS B).

To determine whether continuous base extraction or continuous base treatment is used depends predominantly on the raw material morphology, i.e. dimensions and its ability to stay intact through out the continuous process. Here, the process temperature, solvent feed, inclination, volume and speed can also have an affect on how the raw material behaves during the continues process.

The temperature of the continuous extraction process has a considerable effect on the resulting chemical composition of the liquid extract, such as the molecular weigh of solubilized saccharide compounds. For example, pectin, in its native form, is a branched polysaccharide consisting of $\alpha$-(1-4)-linked D-galacturonic acid repeating units. A continuous base extraction at 80° C. typically yields small-molecular-weight oligomeric and/or monomeric pectin-based galacturonic acid sugar motifs, in addition to other mono or oligosaccharide structures in the liquid extract. The same base extraction process at 40° C. typically yields pectin-based polysaccharides consisting of $\alpha$-(1-4)-linked D-galacturonic acid repeating units in the liquid extract.

Example C: Continuous Process to Obtain Parenchymal Cell Cellulose and Nanofibrillar Parenchymal Cellulose: Process A Continuous base extraction or continuous base treatment using a counter current extractor is done according to FIG. 1 (Stage 1). Here, the base extraction or base treatment (e.g. binding polymers and their hydrolysis products) can be done by running the parenchymal raw material (Raw material, FIG. 1: PROCESS A) through a counter current extraction procedure (CC Extractor 1, FIG. 1: PROCESS A). Here, at least one solvent feed (Solvent feed 1, FIG. 1: PROCESS A) most preferably adds alkali solution into the continuous process through the second end. Optionally, one or more solvent feeds can be used anywhere along the CC Extractor. This process contains least one Liquid extract (Liquid extract 1, FIG. 1: PROCESS A) most preferably at the first end. Optionally, one or more liquid extracts can be used anywhere along the CC Extractor. The resulting base extracted or base treated parenchymal cell cellulose (Solid extract 1, FIG. 1: PROCESS A) can be nanofibrillated or optionally washed (see Stage 2, Process A).

Stage 2, washing with water to further extract soluble components (e.g. salt, binding polymers and their hydrolysis products and the remaining base) can be done by running the base extracted parenchymal cell cellulose (Solid Extracts 1, FIG. 1 PROCESS A) through another counter current extraction procedure (CC Extractor 2, FIG. 1: PROCESS A).

Here, the solvent feed (Solvent feed 2, FIG. 1: PROCESS A) most preferably adds water, a basic solution or an acidic solution into the extractor at the second end. Optionally, one or more solvent feeds can be used anywhere along the CC Extractor. The process contains least one Liquid extract (Liquid extract 2, FIG. 1: PROCESS A) most preferably at the first end. Optionally, one or more liquid extracts can be used anywhere along the CC Extractor.

Stage 3. The resulting washed parenchymal cell cellulose (Solid extract 2, FIG. 1: PROCESS A) can be nanofibrillated as in in a refiner. Alternatively, this parenchymal cell cellulose is nanofibrillated after dilution or concentration, at a specific pH and ionic strength. The refiner can be any suitable device, which is able to process the treated parenchymal cellulose raw material to nanofibrillar cellulose. Especially well suitable devices are so called rotor-stator or rotor-rotor mixers, such as Atrex® gringers, which allow a continuous refining process. The material from Stage 2 is typically fed to the refiner with or transfer screw or belt. The refining can contain sequential refining passages, i.e. the treated parenchymal cellulose material can be fibrillated once or several times to obtain desired quality of nanofibrillar parenchymal cellulose. The discharging unit of the refining device can be used to post-process the nanofibrillar parenchymal cellulose to desired shape, for example extrude the material to pellets.

Example D: Continuous Process to Obtain Parenchymal Cell Cellulose and Nanofibrillar Parenchymal Cellulose: Process B Base extraction or base treatment of parenchymal raw material can be done using a combination of the aforementioned batch process and continuous process in such a way that the overall process becomes continuous (FIG. 2, PROCESS B). In more detail, the parenchymal raw material is mixed with a specific amount of alkali solution (Mixer, FIG. 2, PROCESS B) and then transferred to a medium consistency reactor (MC Reactor 1, FIG. 2, PROCESS B) at a certain selected temperature. Alternatively, raw material is diluted. Alternatively, the Mixer and MC Reactor are combined into one device. This process, can be done at low (<5%), medium (5-15%) or high (>15%) consistencies; though, most preferably in medium consistency or high consistency.

Optionally, the resulting base treated mixture (Mixture 1) can be nanofibrillated as is (Stage 3, PROCESS B). Alternatively, this mixture can be nanofibrillated after dilution or concentration, at a specific pH and ionic strength.

Optionally, the resulting base treated mixture (Mixture 1) can be run through an extractor (Extractor 1, FIG. 2, PROCESS B) to separate the soluble components from the base treated parenchymal cell cellulose pulp. The resulting solid extract (Solid extract 0, FIG. 2, PROCESS B) can be nanofibrillated as is (Stage 3, PROCESS B). Alternatively, this mixture can be nanofibrillated after dilution or concentration, at a specific pH and ionic strength.

Mixture 1 can be washed, for example, by running it through a counter current reactor (Stage 2, FIG. 2). Here, Mixture 1 can be washed with water to extract soluble components (e.g. salt, binding polymers and their hydrolysis products and the remaining base). Here there is at least one solvent feed outlet and most preferably at least one water solvent feed for effective washing. Alternatively, two or more solvent feeds can be used with different sequences of base, acid or neutral water. The resulting base extracted and washed parenchymal cell pulp (Solid extract 1, FIG. 2: PROCESS B) can be nanofibrillated as is. Alternatively, this solids extract is nanofibrillated after dilution or concentration, at a specific pH and ionic strength. The refiner can be any suitable device, which is able to process the treated parenchymal cellulose raw material to nanofibrillar cellulose. Especially well suitable devices are so called rotor-stator or rotor-rotor mixers, such as Atrex® gringers, which allow a continuous refining process. The material from Stage 2 is typically fed to the refiner with or transfer screw or belt. The refining can contain sequential refining passages, i.e. the treated parenchymal cellulose material can be fibrillated once or several times to obtain desired quality of nanofibrillar parenchymal cellulose.

Example E: Continuous Production Processes to Obtain Parenchymal Cell Cellulose and Nanofibrillar Parenchymal Cellulose Based on Sugar Beet Sample 200. Never dried sugar beet cuttings were base extracted using PROCESS A (FIG. 1). The typical dimension of a single cutting was initially 3 cm×0.5 cm×0.5 cm. The dry matter content of the Raw material was 24%. Stage 1 Liquid feed 1 was 0.3 M NaOH. Solvent feed 2 was water. Both stages 1 and 2 were conducted at 80° C. After the process, the sample was mechanically fibrillated using a rotor-rotor mixer (2 pass: Sample 200.2 & 4 pass: Sample 200.4, 1800 rpm).

Sample 202. Never dried sugar beet cuttings were base extracted using PROCESS A (FIG. 1). The typical dimension of a single cutting was initially 3 cm×0.5 cm×0.5 cm. The dry matter content of the Raw material was 24%. Stage 1 Solvent feed 1 was 0.5 M NaOH. Solvent feed 2 was water. Both stages 1 and 2 were conducted at 80° C. After the process, the sample was mechanically fibrillated using a rotor-rotor mixer (2 pass: Sample 202.2 & 4 pass: Sample 202.4, 1800 rpm).

Sample 215. Never dried sugar beet cuttings were processed using PROCESS B (FIG. 22). The typical dimension of a single cutting was initially 3 cm×0.5 cm×0.5 cm. The dry matter content of the Raw material was 24%. Stage 1 mixing was done in 0.7 M NaOH. Solvent feed 2 was water. Both stages 1 and 2 were conducted at 80° C. After Stage 2, the sample was mechanically fibrillated using a rotor-rotor mixer (4 pass: Sample 215.4, 1800 rpm).

Sample 214. Never dried sugar beet cuttings were processed using PROCESS B (FIG. 2). The typical dimension of a single cutting was initially 3 cm×0.5 cm×0.5 cm. The dry matter content of the Raw material was 24%. Stage 1 mixing was done in 0.4 M NaOH. Solvent feed 2 was water. Both stages 1 and 2 were conducted at 80° C. After Stage 2, the sample was mechanically fibrillated using a rotor-rotor mixer (4 pass: Sample 214.4, 1800 rpm), data not shown.

Sample 216. Never dried sugar beet cuttings were processed using PROCESS B (FIG. 2). The typical dimension of a single cutting was initially 3 cm×0.5 cm×0.5 cm. The dry matter content of the Raw material was 24%. Stage 1 mixing was done in 0.6 M NaOH. Solvent feed 2 was water. Both stages 1 and 2 were conducted at 80° C. After Stage 2, the sample was mechanically fibrillated using a rotor-rotor mixer (4 pass: Sample 216.4, 1800 rpm), data not shown.

Sample 224. Never dried sugar beet cuttings were processed using PROCESS B (FIG. 2). The typical dimension of a single cutting was initially 3 cm×0.5 cm×0.5 cm. The dry matter content of the Raw material was 24%. Stage 1 mixing was done in 0.8 M NaOH. Solvent feed 2 was water. Both stages 1 and 2 were conducted at 80° C. After Stage 2, the sample was mechanically fibrillated using a rotor-rotor mixer (4 pass: Sample 224.4, 1800 rpm), data not shown.

TABLE 1

Tabulated data on PROCESS A and (Samples: 200, 202, 207, 213) & PROCESS B (Samples: 214, 215, 216, 224) done for never dried sugar beet cuttings, see FIG. 1 & FIG. 2 for process references.

| Sample | 200 | 202 | 207 | 213 | 215 | 214 | 216 | 224 |
|---|---|---|---|---|---|---|---|---|
| Process | A | A | A | A | B | B | B | B |
| Rotation speed of CC Extractors 1 & 2 (s/cycle) | 290 | 290 | 300 | 290 | 294 | 294 | 265 | 274 |
| Raw material (kg/h) | 11.8 | 11.8 | 12 | 8.6 | — | — | | — |
| Raw material (dm3/h) | 19.7 | 19.7 | 20 | 14.4 | — | — | | — |
| Solvent feed 1 (l/h) | 12 | 12 | 18 | 17.5 | — | — | | — |
| Solvent feed 1 (mol/l) | 0.3 | 0.5 | 0.5 | 0.3 | — | — | | — |
| pH of Liquid extract 1 | 4.7 | 8 | 11.4 | 4.7 | — | — | | — |
| pH of Solid extract 1 | 9.9 | 12.7 | 13.2 | 12.6 | — | — | | — |
| Solvent feed 2 (l/h) | 26.8 | 26.8 | | 31.7 | 26.8 | 26.3 | 31 | 37 |
| pH of Liquid Extract 2 | 9.5 | 10.9 | 13 | 10.1 | 13.1 | 7.7 | 8.2 | 13.1 |
| pH of Solid extract 2 | 10 | 10.6 | 11 | 9.8 | 10.9 | 7.2 | 7.9 | 10.9 |
| Dry matter content of Liquid extract 1 (%) | 4.3 | 6 | 6.9 | 4.8 | — | — | — | — |
| Dry matter content of Solid extract 1 (%) | 12.9 | 14.8 | 13.6 | 13.2 | — | — | — | — |
| Dry matter content of Liquid Extract 2 (%) | 4.3 | 4.9 | 4.8 | 3.8 | 4.6 | 1.7 | 1.9 | 3.7 |
| Dry matter content of Solid extract 2 (%) | 9.4 | 9.6 | 8.7 | 7.8 | 6 | 8.3 | 7.2 | 5.7 |
| Pulp yield Stage 1 (%) | 74.9 | 80.3 | 58 | 75 | 100 | 100 | 100 | 100 |
| Pulp yield Stage 2 (%) | 69.4 | 48 | 45 | 63 | 48.9 | 78 | 74 | 43 |
| Total yield | 51.9 | 38.5 | 26 | 47 | 48.9 | 78 | 74 | 43 |

TABLE 2

Summary of the raw material information, extraction parameters, and fibrillation methods.

| Sample | Raw material/form | NaOH concentration (mol/l) | Extraction method | Fibrillation method/concentration |
|---|---|---|---|---|
| 172.4 | Sugar beet pulp/dry pellet | 0.05 | Batch | Rotor-rotor mixer (1800 rpm) 4 passages, 3.6% |
| 174.4 | Potato pulp/dry powder | 0.05 | Batch | Rotor-rotor mixer (1800 rpm) 4 passages, 3.6% |
| 174.4H | Potato pulp/dry powder | 0.05 | Batch | Homogenizer (600 bar) 4 passages, 1.0% |
| 200.4 | Sugar beet pulp/Fresh cutting | 0.3 | PROCESS A | Rotor-rotor mixer (1800 rpm) 4 passages, 10% |
| 200.2 | Sugar beet pulp/Fresh cutting | 0.3 | PROCESS A | Rotor-rotor mixer (1800 rpm) 2 passages, 10% |
| 202.4 | Sugar beet pulp/Fresh cutting | 0.5 | PROCESS A | Rotor-rotor mixer (1800 rpm) 4 passages, 10% |
| 202.2 | Sugar beet pulp/Fresh cutting | 0.5 | PROCESS A | Rotor-rotor mixer (1800 rpm) 2 passages, 10% |
| 207.2 | Sugar beet pulp/Fresh cutting | 0.5 | PROCESS A | Rotor-rotor mixer (1800 rpm) 4 passages, 10% |
| 207.4 | Sugar beet pulp/Fresh cutting | 0.5 | PROCESS A | Rotor-rotor mixer (1800 rpm) 2 passages, 10% |
| 213.2 | Sugar beet pulp/Fresh cutting | 0.3 | PROCESS A | Rotor-rotor mixer (1800 rpm) 4 passages, 10% |
| 213.4 | Sugar beet pulp/Fresh cutting | 0.3 | PROCESS A | Rotor-rotor mixer (1800 rpm) 2 passages, 10% |
| 214.4 | Sugar beet pulp/Fresh cutting | 0.4 | PROCESS B | Rotor-rotor mixer (1800 rpm) 4 passages, 10% |
| 216.4 | Sugar beet pulp/Fresh cutting | 0.6 | PROCESS B | Rotor-rotor mixer (1800 rpm) 4 passages, 10% |
| 215.4 | Sugar beet pulp/Fresh cutting | 0.7 | PROCESS B | Rotor-rotor mixer (1800 rpm) 4 passages, 10% |
| 224.4 | Sugar beet pulp/Fresh cutting | 0.8 | PROCESS B | Rotor-rotor mixer (1800 rpm) 4 passages, 10% |

Using the processes and related process parameters described in Tables 1 and 2 it was possible to produce parenchymal cell cellulose from potato and sugar beet raw materials. After refining the obtained materials with a homogenizer or Atrex-type rotor-rotor mixer nanofibrillar parenchymal cellulose was obtained. The viscosity and turbidity values of the fibrillated products are described in Table 3.

Example F: Continuous Production Processes to Obtain Bleached Parenchymal Cell Cellulose or Bleached Nanofibrillar Parenchymal Cellulose Based on Sugar Beet Base extracted sugar beet (Sample 215) cuttings were bleached using PROCESS A (FIG. 1). The typical dimension of a single cutting was initially 1-3 cm×0.5 cm×0.5 cm. The dry matter content of the Raw material (Sample 215) was 10% Solvent feed 1 contained sodium hypochlorite as a bleaching agent (0.1 M). For every 8000 g of parenchymal cell cellulose pulp, 2000 g of 0.1 M sodium hyochlorite was added. After Stage 2 washing with water, the bleached parenchymal cell cellulose was mechanically fibrillated using a rotor-rotor mixer (4 pass, 1800 rpm). The obtained bleached parenchymal cell cellulose was almost white after the bleaching process.

The bleaching can alternatively conducted using a process B, FIG. 2, wherein the bleaching stage is conducted at stage 1 and the washing step is conducted with counter-current process.

Example G: Characterization of the Nanofibrillar Parenchymal Cellulose

Viscosity and Turbidity

The viscosity of the fibrillated parenchymal cellulose was measured by Brookfield DV3T viscosimeter (Brookfield Engineering Laboratories, Middleboro, USA) equipped with a vane geometry (V-72, diameter 21.67 mm, length 43.38 mm). The product was diluted with water to a concentration of 1.0 wt %, and the sample was agitated for 10 min before the measurement followed by degassing in vacuum to remove the entrapped air bubbles in the sample. The temperature was adjusted to 20° C. prior to measurements. The viscosity of the samples was measured at 50 and 100 rpm shear rates.

Turbidity of dilute aqueous dispersions of fibrillated parenchymal cellulose was measured with HACH P2100 turbidimeter. The product was diluted with water to a concentration of 0.1 wt %, and the sample was agitated for 10 min before the measurement followed by degassing in vacuum to remove the entrapped air bubbles in the sample. The temperature was adjusted to 20° C. prior to the measurement where the emission of light scattered from particles of a sample was detected.

TABLE 3

Summary of the turbidity and viscosity results.

| Sample | Turbidity (NTU) | Viscosity 50 rpm (Pa s) | Viscosity 100 rpm (Pa s) |
|---|---|---|---|
| 172.4 | — | — | — |
| 174.4 | — | 955 | 609 |
| 174.4H | 572 | 841 | 428 |
| 200.2 | 229 | 262 | 172 |
| 200.4 | 233 | 329 | 211 |
| 202.2 | 228 | 480 | 275 |
| 202.4 | 268 | 442 | 260 |
| 207.2 | 430 | 781.4 | 459.5 |
| 207.4 | 452 | 537.2 | 319.7 |
| 213.2 | — | | |
| 213.4 | — | | |
| 215.4 | | | |

High-Performance Liquid Chromatography

The raw material, processed pulp and the by-product were characterized using high performance liquid chromatography. An HPLC analysis was carried out on a Waters Alliance 2695 HPLC system (Waters Corporation, Milford, Mass.). System consisted of a quaternary solvent delivery system, an online degasser, an autosampler, a column temperature controller, and a refractive index (RI) detector. Monosaccharides were separated on a Unison UK-Amino column (3 μm, 250×3 mm, Imtakt Corp.). The mobile phase was acetonitrile: water mixture of 93:7 (v/v), The mobile phase was delivered at a flow rate of 0.8 ml/min and column temperature was set at 55° C. RI detectors temperature was set at 50° C. Sample injection volume was 10 μl.

Monosaccharides of the raw material, processed pulp and the by-product were determined by two-step acid hydrolysis, in which 0.03 g of dried and grinded sample was first hydrolyzed by 0.3 ml of 72% (w/v) sulfuric acid at 35° C. for 1 hour, followed by dilution to 4% (w/v) acid concentration for additional hydrolysis at 121° C. for 1 hour. After the hydrolysis sample was neutralized to pH 5 with barium hydroxide. Sample was centrifuged and liquid transferred to a new vial. Prior to the HPLC analysis the sample was diluted 1:2 with acetonitrile and filtered through a 0.2 μm filter.

According to the HPLC analysis of hydrolysed samples, the alkali treated samples have higher glucose content than non-treated samples, due to relative increase in the cellulose content. According to this method, the glucose amount of the raw material and products with a 100% yield have 18 mol. % glucose content. Also, according to this method, the glucose content for Solid Extract 1 (Process A) is 18-50 mol. % and the glucose content for Solid extract 2 (Process A) is 20-70 mol. %.

Characterization Using Transmission Electron Microscopy

The Microscopy Sample was Prepared by Depositing 3 uL of a Dilute suspension onto a Formvar grid (30 s=$O_2/H_2$ plasma). This grid was washed 3 times with water by depositing small drops of water and removing them with filter paper. The sample was shadow coated with 2 nm of platinum and imaged using a FEI Tecnai 12, bright field, 120 kV.TEM images reveals nanofibrillar parenchymal cellulose structures, with diameter varying from 4 nm to 100 nm, length exceeding 10 micrometers.

Example H Post-Processing: Drying and Activation

After mechanical fibrillation, the resulting nanofibrillar parenchymal cellulose could be post-processed into a desired form, such as pellets. After PROCESS A and after 4 passages through the rotor-rotor mixer (1800 rpm), the dry matter content is typically around 15-25%. Such nanofibrillar parenchymal cellulose can be extruded into free-standing cylindrical pellets, for example with a length of 1.5 cm and diameter of 0.5 cm. For the purpose of this example, said 15-25% pellets are called 'medium consistency pellets'. Said cylindrical medium consistency pellets with dry matter content between 15-25% can be further dried using, for example a fluidised bed (Retsch TG 200) into 'high consistency pellets' (26-90%) and 'dry pellets' (91-100%).

High consistency pellets were made by placing 357.2 g of medium consistency pellets with dry matter content of 20.5% into the fluidised bed and first drying at 60° C. for 10 minutes and then at 80° C. for 15 minutes. The resulting high consistency pellets had a dry matter content of 66.4% and packing density of 312 kg/m$^3$.

Dry pellets could be fabricated by placing 479.6 g of medium consistency pellets into the fluidised bed and drying them at 80° C. for 5 minutes. The resulting high consistency pellets had a dry matter content of 98.3% and packing density of 440 kg/m$^3$.

The pellets could be activated by re-suspending them into water using mechanical shear. Three times 10 s mixing intervals with an immersion mixer (Bamix M180, Esge Ag, Switzerland, operated at 17500 rpm, multipurpose blade,) interspersed with 20 s rest intervals sufficed to re-disperse dry pellets produced into 1 wt. % suspension. Prior to the re-dispersing sequence, the pellets were hydrated for 1.5 h in a magnetic stirrer at RT, stirring speed of 300 rpm.

Example I Post-Processing: Drying and Activation

Sample 200.4.

After mechanical fibrillation, the resulting nanofibrillar parenchymal cellulose could be post-processed into a desired form, such as pellets. After PROCESS A and after 4 passages through the rotor-rotor mixer (1800 rpm), the dry matter content is typically around 15-25%. Such fibrillated parenchymal cellulose can be extruded into free-standing cylindrical pellets, for example with a length of 1.5 cm and diameter of 0.5 cm. For the purpose of this example, said 15-25% pellets are called 'medium consistency pellets'. Said cylindrical medium consistency pellets with dry matter content between 15-25% can be further dried using, for example a fluidised bed (Retsch TG 200) into 'high consistency pellets' (26-90%) and 'dry pellets' (91-100%).

High consistency pellets were made by placing 357.2 g of medium consistency pellets with dry matter content of 20.5% into the fluidised bed and first drying at 60° C. for 10 minutes and then at 80° C. for 15 minutes. The resulting high consistency pellets had a dry matter content of 66.4% and packing density of 312 kg/m$^3$.

Dry pellets could be fabricated by placing 479.6 g of medium consistency pellets into the fluidised bed and drying them at 80° C. for 5 minutes. The resulting high consistency pellets had a dry matter content of 98.3% and packing density of 440 kg/m$^3$.

Sample 331.1.

A nanofibrillated sample, which was obtained from Process A wherein a recovered Solid extract 1 was refined 1 pass through the rotor-rotor mixer (1800 rpm) using the optional bypass that was then processed into dry pellets (see method for Sample 200.4, Example I).

Sample 336.1.

A nanofibrillated sample, which was obtained from Process B wherein Mixture 1 (with a 100% yield) was refined 1 pass through the rotor-rotor mixer (1800 rpm) using the optional bypass that was then processed into dry pellets (see method for Sample 200.4).

Sample 387.1.

A nanofibrillated sample, which was obtained from Process B wherein a recovered Solid extract 0 was refined 1 pass through the rotor-rotor mixer (1800 rpm) using the optional bypass that was then processed into dry pellets (see method for Sample 200.4).

All processed dry pellets could be activated by re-suspending them into water using mechanical shear. Three times 10 s mixing intervals with an immersion mixer (Bamix M180, Esge Ag, Switzerland, operated at 17500 rpm, multipurpose blade,) interspersed with 20 s rest intervals sufficed to re-disperse dry pellets produced into 1 wt. % suspension. Prior to the re-dispersing sequence, the pellets were hydrated for 1.5 h in a magnetic stirrer at RT, stirring speed of 300 rpm.

TABLE 3

Summary of the turbidity and viscosity results.

| Sample | Turbidity (NTU) | Viscosity 50 rpm (Pa s) | Viscosity 100 rpm (Pa s) |
|---|---|---|---|
| 200.4 | — | — | — |
| 331.1 | 187 | 208 | 124 |
| 336.1 | 131 | 71 | 49 |
| 321.1 | 128 | 175 | 129 |

Example J: Recovering a Solid Extract: Process A & Process B

Recovering the Solid extract (Process A and/or Process B) can be done using a concentrating screw conveyor, wherein the pulp is transferred from one stage to another. During this recovering process the dry matter content of the Solid extract can be increased, e.g. from 5% to 8-30%.

Recovering Solid extract 2 after the counter current extraction step (Process A, Stage 2) can also be done by harvesting the extracted parenchymal pulp into a double screw press that concentrates the solid extract from 5% to 8-30%. This recovery process can be continued e.g. by adding biocide to the product. The recovered solid extract can then be refined in following process step (Process A, step 3).

Transferring the Solid extract from one stage to another can be done using a conveyor belt. For example, with a mesh-like belt, the product can be concentrated during the recovering process. Biocide can be added during the recovering process.

Example K: Process to Obtain Parenchymal Cell Cellulose, Nanofibrillar Parenchymal Cellulose and Water Soluble Product: Process B Base extraction or base treatment of parenchymal raw material can be done using a combination of the aforementioned batch process and continuous process in such a way that the overall process becomes continuous (FIG. 2, PROCESS B). In more detail, the parenchymal raw material is mixed with a specific amount of alkali solution (Mixer, FIG. 2, PROCESS B) and then transferred to e.g. a continuous medium consistency reactor (MC Reactor 1, FIG. 2, PROCESS B) at a selected temperature. Alternatively, the raw material is diluted. Alternatively, the Mixer and MC Reactor are combined into one device. This process, can be done at low (<5%), medium (5-15%) or high (>15%) consistencies; though, most preferably 15-25% consistency.

The resulting base treated mixture (Mixture 1) can be run through an extractor (Extractor 1, FIG. 2, PROCESS B) to separate the soluble components from the base treated parenchymal cell cellulose pulp. The resulting solid extract (Solid extract 0, FIG. 2, PROCESS B) can be nanofibrillated as is (Stage 3, PROCESS B).

The Liquid extract (Liquid extract 0) typically comprises of fully or partially hydrolysed pectin and hemicelluloses. These can be extracted as polymers, oligomers, or small molecular compounds.

The invention claimed is:

1. A continuous method for producing parenchymal cell cellulose comprising:
   a. Treating parenchymal cellulose raw material selected from sugar beet pulp, cassava pulp, and potato pulp, and mixtures thereof with an alkali;
   b. recovering a first solid extract;
   c. washing the recovered first solid extract with a solvent and recovering a second solid extract; and
   d. refining the second solid extract to obtain nanofibrillar parenchymal cellulose, wherein the solids content of the first recovered solid extract and/or the recovered second solid extract comprising parenchymal cell cellulose is at least 8 wt%, and wherein the step a and step c are conducted using a counter-current process.

2. The method according to claim 1 carried out using a concentrating screw conveyor.

3. The method according to claim 1, wherein the parenchymal cellulose raw material has, in average, at least one dimension having a length of at least 3 mm during the step a, and optionally during the step c.

4. The method according to claims 1 comprising a bleaching and/or chemical modification step selected from oxidation, cationization, acetylation, electrophilic substitution, esterification, and etherification, the chemical modification step being carried out before, during or after steps a or c.

5. The method according to claim 1 further comprising a concentrating step to increase concentration to above 8 wt%.

6. The method according to claim 1, wherein the refining step is carried out to obtain a nanofibrillar parenchymal cellulose having solids content corresponding to or being higher than the solids content after the step a or step c.

7. The method according to claim 1, wherein the obtained nanofibrillar parenchymal cellulose is concentrated to a concentration above 8%.

8. The method according to claim 1, wherein the nanofibrillar parenchymal cellulose is further processed into a form of a granulate, dry or wet powder, pellet, tablet, briket, or any other discrete physical entity having at least one dimension less than 10 cm, or any combination of these, by compressing, extruding, cutting, blowing or milling.

* * * * *